(12) United States Patent
Burton et al.

(10) Patent No.: US 12,725,740 B2
(45) Date of Patent: Sep. 1, 2026

(54) VARIABLE CAPACITOR

(71) Applicant: British Telecommunications Public Limited Company, London (GB)

(72) Inventors: Fraser Burton, London (GB); Malcolm Hubert, London (GB); Aaron Walker, London (GB)

(73) Assignee: BRITISH TELECOMMUNIATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 19/149,716

(22) PCT Filed: Dec. 6, 2023

(86) PCT No.: PCT/EP2023/084526
§ 371 (c)(1),
(2) Date: Jul. 21, 2025

(87) PCT Pub. No.: WO2024/156416
PCT Pub. Date: Aug. 2, 2024

(65) Prior Publication Data

US 2026/0120958 A1 Apr. 30, 2026

(30) Foreign Application Priority Data

Jan. 23, 2023 (EP) .................................... 23152897

(51) Int. Cl.
*H01G 5/18* (2006.01)
*B33Y 80/00* (2015.01)
*B33Y 30/00* (2015.01)

(52) U.S. Cl.
CPC ................ *H01G 5/18* (2013.01); *B33Y 80/00* (2014.12); *B33Y 30/00* (2014.12)

(58) Field of Classification Search
CPC .. H01G 5/00; H01G 5/16; H01G 5/18; H01G 7/00
See application file for complete search history.

(56) References Cited

U.S. PATENT DOCUMENTS 4,060,750 A 11/1977 Tashiro
4,075,534 A 2/1978 Saito
(Continued)

FOREIGN PATENT DOCUMENTS

EP 1588453 B1 6/2009
EP 3109034 A1 12/2016
(Continued)

OTHER PUBLICATIONS

Xiao Yu Li et al., "Array Failure Diagnoses and Active Compensation for Intelligent Reflecting Surfaces", 2021 IEEE International Symposium on Antennas and Propagation and USNC-URSI Radio Science Meeting (APS/URSI), 2021 IEEE (2 pages).
(Continued)

*Primary Examiner* — Nathan Milakovich
(74) *Attorney, Agent, or Firm* — Nixon & Vanderhye P.C.

(57) ABSTRACT

A variable capacitor comprising: a first elongate member comprising a first electrically conductive portion positioned towards a first distal end of the first elongate member and a second electrically conductive portion positioned towards a second distal end of the first elongate member, wherein the first elongate member is configured to pivot on a first fulcrum positioned between the first and second electrically conductive portions, wherein a first distance between the first fulcrum and the first electrically conductive portion of the first elongate member is different to a second distance between the first fulcrum and the second electrically conductive portion of the first elongate member; a second
(Continued)

elongate member comprising a first electrically conductive portion positioned towards a first distal end of the second elongate member and a second electrically conductive portion positioned towards a second distal end of the second elongate member, wherein: one of the first and second elongate members is a cathode and the other of the first and second elongate members is an anode, a first capacitor is formed by the respective first electrically conductive portions of the cathode and anode, wherein a capacitance of the first capacitor is a function of a first pivoting angle of the first elongate member on the first fulcrum, and a second capacitor is formed by the respective second electrically conductive portions of the cathode and anode, wherein a capacitance of the second capacitor is a function of the first pivoting angle of the first elongate member on the first fulcrum, the first and second electrically conductive portions of the cathode are connected to a positive voltage of a first electric circuit, the first and second electrically conductive portions of the anode are connected to a negative voltage of the first electric circuit, such that the first and second capacitors are connected in parallel, and wherein: application of an electrical potential difference by the first electric circuit causes pivoting of the first elongate member and a corresponding variation in the capacitance of the first capacitor that is proportional to the electrical potential difference and a corresponding variation in a capacitance of the second capacitor that is inversely proportional to the electrical potential difference, wherein the magnitude of the variations in capacitances of the first and second capacitors are different such that a sum of the capacitances of the first and second capacitor varies as a function of the electrical potential difference.

11 Claims, 6 Drawing Sheets

(56) References Cited

U.S. PATENT DOCUMENTS

| | | | | |
|---|---|---|---|---|
| 6,242,989 | B1 * | 6/2001 | Barber | H01G 5/16 331/177 V |
| 8,473,123 | B2 | 6/2013 | Sun et al. | |
| 9,905,389 | B2 * | 2/2018 | Ghanea-Hercock | B29C 64/371 |
| 10,873,812 | B2 | 12/2020 | Subramanian et al. | |
| 10,938,105 | B2 | 3/2021 | Snyder et al. | |
| 11,041,936 | B1 | 6/2021 | Wall et al. | |
| 2004/0036132 | A1 | 2/2004 | de los Santos | |
| 2004/0173876 | A1 * | 9/2004 | Musalem | H01G 5/38 257/595 |
| 2009/0153426 | A1 | 6/2009 | Worl | |
| 2010/0321132 | A1 | 12/2010 | Park | |
| 2013/0286534 | A1 * | 10/2013 | Ikehashi | H01G 5/04 361/281 |
| 2014/0002948 | A1 * | 1/2014 | Yoon | H01G 5/16 361/281 |
| 2014/0152383 | A1 | 6/2014 | Nikonov et al. | |
| 2014/0307361 | A1 | 10/2014 | Kahmen | |
| 2016/0380634 | A1 | 12/2016 | Ghanea-hercock | |
| 2017/0009090 | A1 | 1/2017 | Haghzadeh | |
| 2021/0102293 | A1 | 4/2021 | Braghiroli | |
| 2022/0173520 | A1 | 6/2022 | Manholm et al. | |
| 2022/0321198 | A1 | 10/2022 | Devoti et al. | |
| 2023/0058694 | A1 | 2/2023 | Esfahlani et al. | |

FOREIGN PATENT DOCUMENTS

| | | | |
|---|---|---|---|
| EP | 2921285 | B1 | 2/2018 |
| GB | 2200905 | A1 | 8/1988 |
| GB | 2328791 | A | 3/1999 |
| JP | 11306997 | A | 11/1999 |
| WO | 2007/072404 | | 6/2007 |
| WO | 2007072404 | A2 | 6/2007 |
| WO | 2013/108705 | | 7/2013 |
| WO | 2013108705 | A1 | 7/2013 |

OTHER PUBLICATIONS

Georgios C. Trichopoulos et al., "Design and Evaluation of Reconfigurable Intelligent Surfaces in Real-World Environment", School of Electrical, Computer and Energy Engineering, Arizona State University, Sep. 16, 2021 (29 pages).

Nick Flaherty, "Flexible antenna captures 5G power for IoT", from https://www.eenewseurope.com/news/flexible-antenna-captures-5g-power-iot, Mar. 30, 2021 (2 pages).

Ruitao SU et al., "3D-printed flexible organic light-emitting diode displays", Science Advances, Research Article, 2022, Su et al., Sci. Adv. 8, eabl8798, Jan. 7, 2022 (11 pages).

Muhammad Miftahul Amri, "Recent Trends in the Reconfigurable Intelligent Surfaces (RIS): Active RIS to Brain-controlled RIS", 2022 IEEE International Conference on Communication, Networks and Satellite (Comnetsat), 2022 IEEE (6 pages).

Forum post "An old-school solution to printing reprap electronics?" posted by Peter "Sci" Turpin, London, England, Feb. 2, 2010 (3 pages).

Chang-Hoon Han et al.: "Parallel-Plate MEMS Variable Capacitor With Superior Linearity and Large Tuning Ratio using a Levering Structure", Journal of Microelectromechanical Systems, vol. 20, No. 6, Dec. 2011 (10 pages).

Combined Search and Examination Report for GB2200905.4 Dated Jun. 17, 2022 (8 pages).

Combined Search and Examination Report for GB2300954.1 Dated Jul. 14, 2023 (7 pages).

Goran Stojanovic et al., "Combining rapid prototyping techniques in mechanical engineering and electronics for realization of a variable capacitor", ResearchGate, Article in Rapid Prototyping Journal, Mar. 2014 (7 pages).

Elias de Souza Goncalves et al., "Sensor Fusion with Cointegration Analysis for IMU in a Simulated Fixed-Wing UAV", 2017 International Conference on Military Technologies (ICMT), May 31-Jun. 2, 2017, Brno, Czech Republic (7 pages).

Kamal Prakash Pandey et al., "Design and Analysis of MEMS Varactor", 2018 Recent Advances on Engineering, Technology and Computational Sciences (RAETCS), 2018 IEEE (6 pages).

Rui Sun et al., "Diagnosis of Intelligent Reflecting Surface in Millimeter-wave Communication Systems", CAS Key Laboratory of Wireless-Optical Communications, University of Science and Technology of China, Nov. 3, 2021 (14 pages).

Marco Di Renzo et al., "Smart Radio Environments Empowered by Reconfigurable Intelligent Surfaces: How it Works, State of Research, and the Road Ahead," IEEE Journal on Selected Areas in Communications, Vo. 38, No. 11, Nov. 2020 (76 pages).

Ali Araghi et al., "Reconfigurable Intelligent Surface (RIS) in the Sub-6 GHz Band, Design, Implementation, and Real-World Demonstration", IEEE Access, publication Jan. 4, 2022 (10 pages).

Jilani, S.F. Rahimian et al., "Low-profile flexible frequency-reconfigurable millimetre-wave antenna for 5G applications", Ulster University, Publishes in Flexible and Printed Electronics, Mar. 8, 2018 (10 pages).

Kedi Wu et al., "Modelling of free-form conformal metasurfaces", Article, Nature Communications (2018) (8 pages).

Eid Aline et al: "Inkjet-/3D-Printed Perpetual Electronics and Modules"; IEEE Microwave Magazine, Dec. 2020 (17 pages).

Extended European Search Report for Application No. EP23166607.4 dated Aug. 31, 2023 (6 pages).

Extended EP Search Report for Application No. EP23166608.2 dated Dec. 5, 2023 (11 pages).

GB Combined Search & Exam Report for GB2400804.7 dated Mar. 20, 2024 (5 pages).

Intention to Grant and Examination Report for GB2400804.7 Dated Aug. 2, 2024 (2 pages).

(56) References Cited

OTHER PUBLICATIONS

Intention to grant for UK patent application GB2200905.4, dated Mar. 21, 2024 (2 pages).
International Preliminary Report on Patentability for PCT/EP2022/085598 dated Aug. 8, 2024 (10 pages).
International Search Report & Written Opinion for PCT/EP2023/084526 dated Mar. 18, 2024 (16 pages).
International Search Report & Written Opinion for PCT/EP2024/056062 dated May 10, 2024 (14 pages).
Yuanwei Liu et al., "Reconfigurable Intelligent Surfaces: Principles and Opportunities", IEEE Communications Surveys & Tutorials, vol. 23, No. 3, Third Quarter 2021 (32 pages).
Extended European Search Report dated Dec. 16, 2015, issued for EP 15275161.6 (7 pages).
Qian Ma et al., "Smart metasurface with self-adaptively reprogrammable functions", Article, Open Access, Light: Science & Applications (2019) (12 pages).
The Extended European Search Report for EP23152897.7 Dated Jun. 27, 2023 (11 pages).
The International Search Report and the Written Opinion for PCT/EP2022/085598 Dated Apr. 5, 2023 (17 pages).
Jin-Woo Han et al., Vacuum nanoelectronics: Back to the future?—Gate insulated nanoscale vacuum channel transistor, AIP Applied Physics Letters 100, 213505 (2012), published online May 23, 2012 (5 pages).
The International Search Report and the Written Opinion for PCT/EP2024/056060 Dated May 8, 2024 (14 pages).
Partial European Search Report for EP23166608.2 dated Sep. 4, 2023 (14 pages).
Extended European Search Report for EP14250050.3, dated Sep. 24, 2014 (4 pages).
Kevin Xu et al., "Liquid-Metal-Tuned Patch Element for Flexible and Reconfigurable Reflectarrays/Intelligent Surfaces", Department of Electrical Engineering, University at Buffalo, The State University of New York, 2021 IEEE (2 pages).
Jon Cartwright, "Return of the Vacuum Tube", Comments (/physics/2012/05/return-vacuum-tube#disqus_thread), May 23, 2012 (6 pages).
The International Preliminary Report on Patentability for PCT/EP2023/084526 Dated Aug. 7, 2025 (9 pages).
International Preliminary Report on Patentability dated Oct. 16, 2025, issued for International Application No. PCT/EP2024/056062 (7 pages).
International Preliminary Report on Patentability dated Oct. 16, 2025, issued for International Application No. PCT/EP2024/056060 (7 pages).
International Search Report and Written Opinion of the International Searching Authority dated Mar. 18, 2024, issued for International Application No. PCT/EP2023/084526 (16 pages).
European Application No. EP15275161.6 (41 pages).
European Application No. EP14250050.3 (26 pages).
Extended European Search Report dated Sep. 24, 2014, issued in European Application No. 14250050.3 (4 pages).
Jacob Bayless et al., "Wire Embedding 3D Printer", Engineering Physics, University of British Columbia, Apr. 12, 2010 (45 pages).
Forum post by Peter "Sci" Turpin, "An old-school solution to printing reprap electronics?"dated Feb. 2, 2010 (3 pages).
Collin Ladd et al., "3D Printing of Free Standing Liguid Metal Microstructures", Advanced Materials 2013 (5 pages).
S. Jiguet et al., "Conductive SU8-Silver Composite Photopolymer", Swiss Federal Institute of Technology, Lausanne, Switzerland, 2004 IEEE (4 Pages).
Jacob Bayless, screenshots of "RepRap 3D Printer with Wire Embedding Capability", YouTube—https://www.youtube.com/watch?v=iclmH6-ba5Y, Apr. 14, 2010 (3 pages).

* cited by examiner

VARIABLE CAPACITOR

CROSS-REFERENCE TO THE RELATED APPLICATIONS

This application is the U.S. national phase of International Application No. PCT/EP2023/084526 filed Dec. 6, 2023 which designated the U.S. and claims priority to EP 23152897.7 filed Jan. 23, 2023, the entire contents of each of which are hereby incorporated by reference.

FIELD OF THE INVENTION

The present invention relates to a variable capacitor.

BACKGROUND

A variable capacitor is an electronic device having a capacitance that may be varied by a controllable input. The controllable input may be an electrical potential difference applied across the variable capacitor. A common form of electrical potential difference controlled variable capacitor is the variable capacitance diode, also known as a varicap or varactor, which is typically based on a semiconductor having a reverse-biased p-n junction.

Additive manufacturing, also known as three dimensional (3D) printing, is a process of manufacturing a three dimensional solid object from a model such as a digital model by an additive process in which material is layered, adhered, bonded or otherwise deposited successively until the solid object is formed. Such an approach is in contrast to traditional manufacturing techniques where articles are formed from the assembly of parts which themselves may be machined, cast or moulded. There are many benefits to additive manufacturing over traditional manufacturing techniques, including technical benefits and commercial benefits. Technically, additive manufacturing allows virtually any arrangement of a three dimensional object to be created from a growing number of materials, including plastics, metals and ceramics. The arrangement can include complex features, even internally, since the additive approach to manufacturing is capable of generating complex structure. Additive approaches generate less waste compared to traditional approaches, provide increased consistency between articles of manufacture, improved speed of manufacture from initial design with minimal setup required, the advantages of novel structures and shapes and new combinations of materials. Commercially, additive manufacturing provides considerable cost-savings over traditional manufacturing techniques, especially where a number of articles for manufacture is relatively small. For example, prototypes, proof-of-concepts, spare-parts and articles manufactured in isolated or remote locations, such as in orbit or space, are readily produced at low cost using additive manufacturing. The speed of manufacturing is also a benefit since a three dimensional article can be produced from a three dimensional design relatively rapidly.

An electrical potential difference controlled variable capacitor has not yet been manufactured using an additive manufacturing process. A problem therefore exists in that an object cannot be manufactured using additive manufacturing when that object requires an electrical potential difference variable capacitor. Such an object must be part-manufactured without the electrical potential difference variable capacitor, with the electrical potential difference variable capacitor (or element having an integral variable capacitor) being manufactured separately, and the object assembled by multi-part manufacture. The electrical potential difference variable capacitor may be manufactured using the conventional semiconductor fabrication process, such as when using a variable capacitance diode. This problem therefore diminishes at least some of the aforementioned benefits of additive manufacturing.

SUMMARY OF THE INVENTION

According to a first aspect of the invention, there is provided a variable capacitor comprising: a first elongate member comprising a first electrically conductive portion positioned towards a first distal end of the first elongate member and a second electrically conductive portion positioned towards a second distal end of the first elongate member, wherein the first elongate member is configured to pivot on a first fulcrum positioned between the first and second electrically conductive portions, wherein a first distance between the first fulcrum and the first electrically conductive portion of the first elongate member is different to a second distance between the first fulcrum and the second electrically conductive portion of the first elongate member; a second elongate member comprising a first electrically conductive portion positioned towards a first distal end of the second elongate member and a second electrically conductive portion positioned towards a second distal end of the second elongate member, wherein: one of the first and second elongate members is a cathode and the other of the first and second elongate members is an anode, a first capacitor is formed by the respective first electrically conductive portions of the cathode and anode, wherein a capacitance of the first capacitor is a function of a first pivoting angle of the first elongate member on the first fulcrum, and a second capacitor is formed by the respective second electrically conductive portions of the cathode and anode, wherein a capacitance of the second capacitor is a function of the first pivoting angle of the first elongate member on the first fulcrum, the first and second electrically conductive portions of the cathode are connected to a positive voltage of a first electric circuit, the first and second electrically conductive portions of the anode are connected to a negative voltage of the first electric circuit, such that the first and second capacitors are connected in parallel, and wherein: application of an electrical potential difference by the first electric circuit causes pivoting of the first elongate member and a corresponding variation in the capacitance of the first capacitor that is proportional to the electrical potential difference and a corresponding variation in a capacitance of the second capacitor that is inversely proportional to the electrical potential difference, wherein the magnitude of the variations in capacitances of the first and second capacitors are different such that a sum of the capacitances of the first and second capacitor varies as a function of the electrical potential difference.

Application of the electrical potential difference by the first electric circuit may cause pivoting of the first elongate member due a torque experienced by the first elongate member in a first direction being a product of a force of electrostatic attraction between the first electrically conductive portions of the first capacitor and the first distance between the first fulcrum and the first electrically conductive portion of the first elongate member being greater than a torque experienced by the first elongate member in a second direction being a product of a force of electrostatic attraction between the second electrically conductive portions of the second capacitor and the second distance between the first fulcrum and the second electrically conductive portion of the first elongate member.

The first distance between the first fulcrum and the first electrically conductive portion of the first elongate member may be greater than the second distance between the first fulcrum and the second electrically conductive portion of the first elongate member such that the sum of the capacitances of the first and second capacitor is proportional to the electrical potential difference.

The second distance between the first fulcrum and the second electrically conductive portion of the first elongate member may be greater than the first distance between the first fulcrum and the first electrically conductive portion of the first elongate member and, prior to application of the electrical potential difference, the first pivoting angle of the first elongate member may be such that a first separation distance between the first electrically conductive portions of the first capacitor is less than a second separation distance between the second electrically conductive portions of the second capacitor, such that the sum of the capacitances of the first and second capacitor is inversely proportional to the electrical potential difference.

The second elongate member may be configured to pivot on a second fulcrum positioned between the first and second electrically conductive portions of the second elongate member, wherein a first distance between the second fulcrum and the first electrically conductive portion of the second elongate member may be different to a second distance between the second fulcrum and the second electrically conductive portion of the second elongate member, wherein a capacitance of the first capacitor may be a function of a second pivoting angle of the second elongate member on the second fulcrum and a capacitance of the second capacitor may be a function of the second pivoting angle of the second elongate member on the second fulcrum.

Application of the electrical potential difference by the first electric circuit may cause pivoting of the second elongate member due a torque experienced by the second elongate member in the second direction being a product of a force of electrostatic attraction between the first electrically conductive portions of the first capacitor and the first distance between the second fulcrum and the first electrically conductive portion of the second elongate member being greater than a torque experienced by the second elongate member in the first direction being a product of a force of electrostatic attraction between the second electrically conductive portions of the second capacitor and the second distance between the second fulcrum and the second electrically conductive portion of the second elongate member.

The first distance between the second fulcrum and the first electrically conductive portion of the second elongate member may be greater than the second distance between the second fulcrum and the second electrically conductive portion of the second elongate member.

The second distance between the second fulcrum and the second electrically conductive portion of the second elongate member may be greater than the first distance between the second fulcrum and the first electrically conductive portion of the second elongate member and, prior to application of the electrical potential difference, a second pivoting angle of the second elongate member may be such that the first separation distance between the first electrically conductive portions of the first capacitor is less than the second separation distance between the second electrically conductive portions of the second capacitor.

According to a second aspect of the invention, there is provided apparatus comprising the variable capacitor of the first aspect of the invention.

According to a third aspect of the invention, there is provided an additive manufacturing apparatus for manufacturing an article, the apparatus comprising: a computer system; a first additive manufacturing component adapted to form non-electrically conductive three dimensional structures; a second additive manufacturing component adapted to form electrically conductive three dimensional structures; wherein the first and second additive manufacturing components are operable under control of the computer system, the computer system being adapted to control the components to form a variable capacitor of the first aspect of the invention or the apparatus of the second aspect of the invention.

According to a fourth aspect of the invention, there is provided a computer system for controlling an additive manufacturing apparatus, the additive manufacturing apparatus being adapted to manufacture three dimensional structures from both non-electrically conductive and electrically conductive materials simultaneously, the computer system being operable to control the additive manufacturing apparatus to form a variable capacitor of the first aspect of the invention or the apparatus of the second aspect of the invention.

BRIEF DESCRIPTION OF THE FIGURES

In order that the present invention may be better understood, embodiments thereof will now be described, by way of example only, with reference to the accompanying drawings in which.

DETAILED DESCRIPTION

Figure 1:
FIG. 1 is a cross-sectional view of a first article having an integral variable capacitor.
Figure 1:
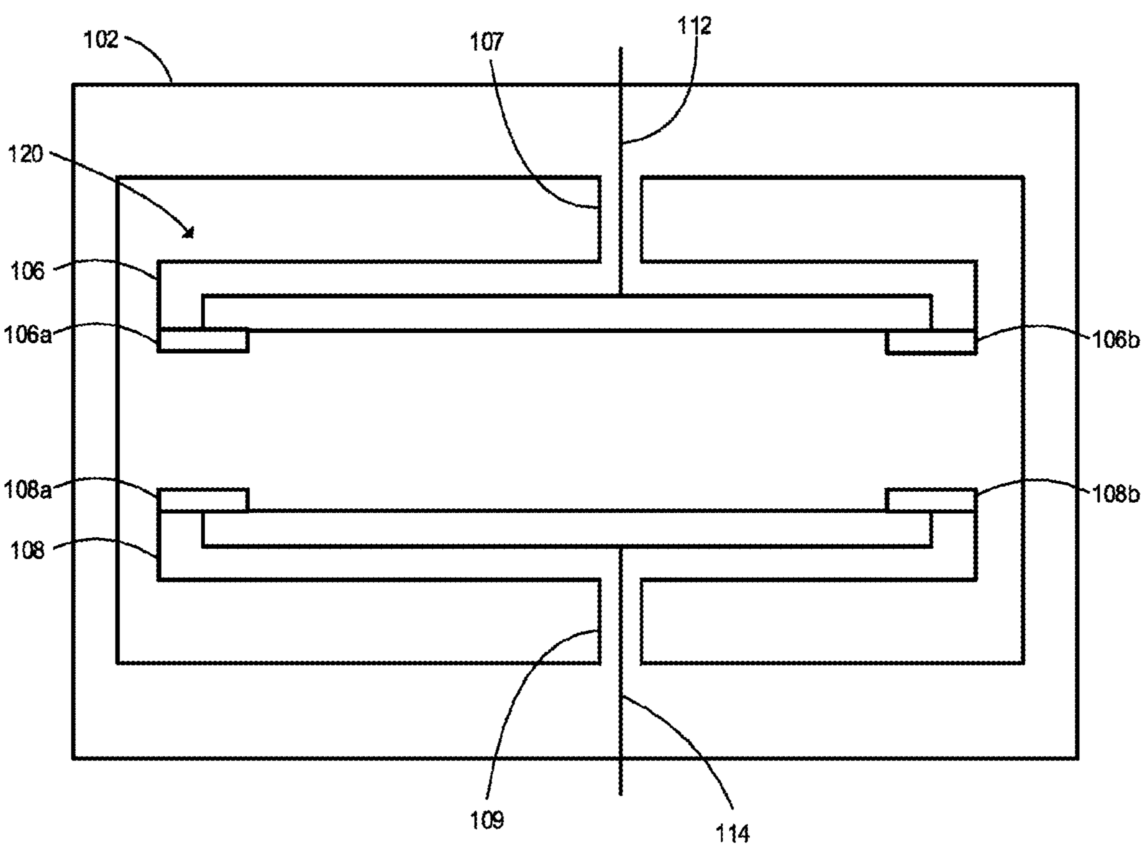

FIG. 1 illustrates a first article 100 having an integral variable capacitor 120. The first article 100 is constructed using an additive manufacturing approach including one or more techniques such as, inter alia: an extrusion deposition process; a material binding process such as selective laser sintering, direct metal laser sintering, selective laser melting or electron beam melting; and/or a stereolithographic approach such as photopolymerisation. Such techniques are also known as three dimensional (3D) printing, and a product or resulting article of such techniques is known as a 3D printed article or apparatus. The first article 100 is comprised of a substantive structure 102 such as a body, framework, lattice, arrangement or other structure substantially constituting the article, otherwise referred to as the fabric of the article. For example, the first article 100 can be, inter alia: a part; prototype; component; appliance; tool; cover; case; model; or any other conceivable three dimensional article. The substantive structure 102 is formed from a non-electrically conductive material by the additive manufacturing process. For example, the substantive structure 102 is a plastic such as a polymer.

The first article 100 has formed within, and integral to, the substantive structure 102, the variable capacitor 120. The variable capacitor 120 is integral to the fabric of the first article 100 and is at least partly constituted by the substantive structure 102 of the first article 100. The variable capacitor 120 is formed in an aperture of the substantive structure 102 of the first article 100. Most preferably, the aperture formed for the diode 120 is a sealed vacuum.

On one side of the aperture a cathode 106 is formed. The cathode 106 is formed as an elongate member constructed of the same non-electrically conductive material forming the substantive structure 102. The cathode 106 is pivotally attached to the substantive structure 102 by a cathode fulcrum 107. The cathode 106 comprises a first arm and second arm on opposing sides of the cathode fulcrum 107. The first arm of the cathode 106 comprises a first electrically conductive portion 106*a* and the second arm of the cathode 106 comprises a second electrically conductive portion 106*b*. These first and second electrically conductive portions 106*a*, 106*b* are formed by an additive manufacturing process, such as the technique described in by Ladd et al in "3D Printing of Free Standing Liquid Metal Microstructures" (Collin Ladd et al, Advanced Materials, Volume 25, Issue 36, pages 5081-5085, Sep. 25, 2013). Ladd et al describe an approach to extruding conductive metal wires at room temperature. Such an approach is particularly suited to combination with extruding of other materials such as polymer extrusion. For example, the first and second electrically conductive portions 106*a*, 106*b* can be constituted of a gallium alloy such as a binary eutectic alloy of gallium and indium which can be extruded in an additive manufacturing process at room temperature as described by Ladd et al. Additionally or alternatively, the first and/or second electrically conductive portions 106*a*, 106*b* are formed by a material binding process such as sintering. For example, direct metal laser sintering, in which a laser is used to precisely and selectively sinter metal powder, can be employed.

On the other side of the aperture an anode 108 is formed. The anode 108 is also formed as an elongate member constructed of the same non-electrically conductive material forming the substantive structure 102. The anode 108 is pivotally attached to the substantive structure 102 by an anode fulcrum 109. The anode 108 comprises a first arm and second arm on opposing sides of the anode fulcrum 109. The first arm of the anode 108 comprises a first electrically conductive portion 108*a* and the second arm of the anode 108 comprises a second electrically conductive portion 108*b*. These first and second electrically conductive portions 108*a*, 108*b* are formed by an additive manufacturing process as described above with respect to the cathode 106.

As shown in FIG. 1, the first and second arms of the cathode 106 are of unequal length and the first and second arms of the anode 108 are of unequal length. The first arms of the cathode 106 and anode 108 may be of equal length (or substantively equal length), but this is non-essential. Similarly, the second arms of the cathode 106 and anode 108 may be of equal length (or substantively equal length), but this is non-essential.

The following is noted regarding the pivoting angles of the cathode 106 relative to the cathode fulcrum 107 and the anode 108 relative to the anode fulcrum 109. In this description, a first pivoting direction is defined as a clockwise direction and a second pivoting direction is defined as an anti-clockwise direction. The cathode 106 may pivot with respect to the pivot fulcrum 107 in a clockwise direction, such that first arm of the cathode 106 moves towards the substantive structure 102 and the second arm of the cathode 106 moves away from the substantive structure 102, or in an anti-clockwise direction, such that the first arm of the cathode 106 moves away from the substantive structure 102 and the second arm of the cathode 106 moves towards the substantive structure 102. Similarly, the anode 108 may pivot with respect to the anode fulcrum 108 in a clockwise direction, such that the first arm of the anode 108 moves away from the substantive structure 102 and the second arm of the anode 108 moves towards the substantive structure 102, or in an anti-clockwise direction, such that the first arm of the anode 108 moves towards the substantive structure 102 and the second arm of the anode 108 moves away from the substantive structure 102.

Furthermore, a frictional torque is imparted by the cathode fulcrum 106 to the cathode 106 so as to resist change in pivoting angle due to torque acting on the cathode 106. Absent any other force acting on the cathode 106, the cathode 106 experiences a net gravitational torque as the difference in a torque due to a gravitational force acting on its longer arm in one direction and a torque due to a gravitational force acting on its shorter arm in the other direction. The frictional torque of the cathode fulcrum 107 is greater than the net gravitational torque such that the cathode 106 does not pivot at the cathode fulcrum 107 due to the net gravitational torque alone. The cathode 106 can therefore be manufactured with a predetermined at rest pivoting angle (that is, the pivoting angle of the cathode 106 when only gravitational forces are experienced by the cathode 106) at the cathode fulcrum 107. The frictional torque of the anode fulcrum 109 is similarly greater than a net gravitational torque experienced by the anode 108 such that the anode 108 can be manufactured with a predetermined at rest pivoting angle at the anode fulcrum 109.

Figure 2:
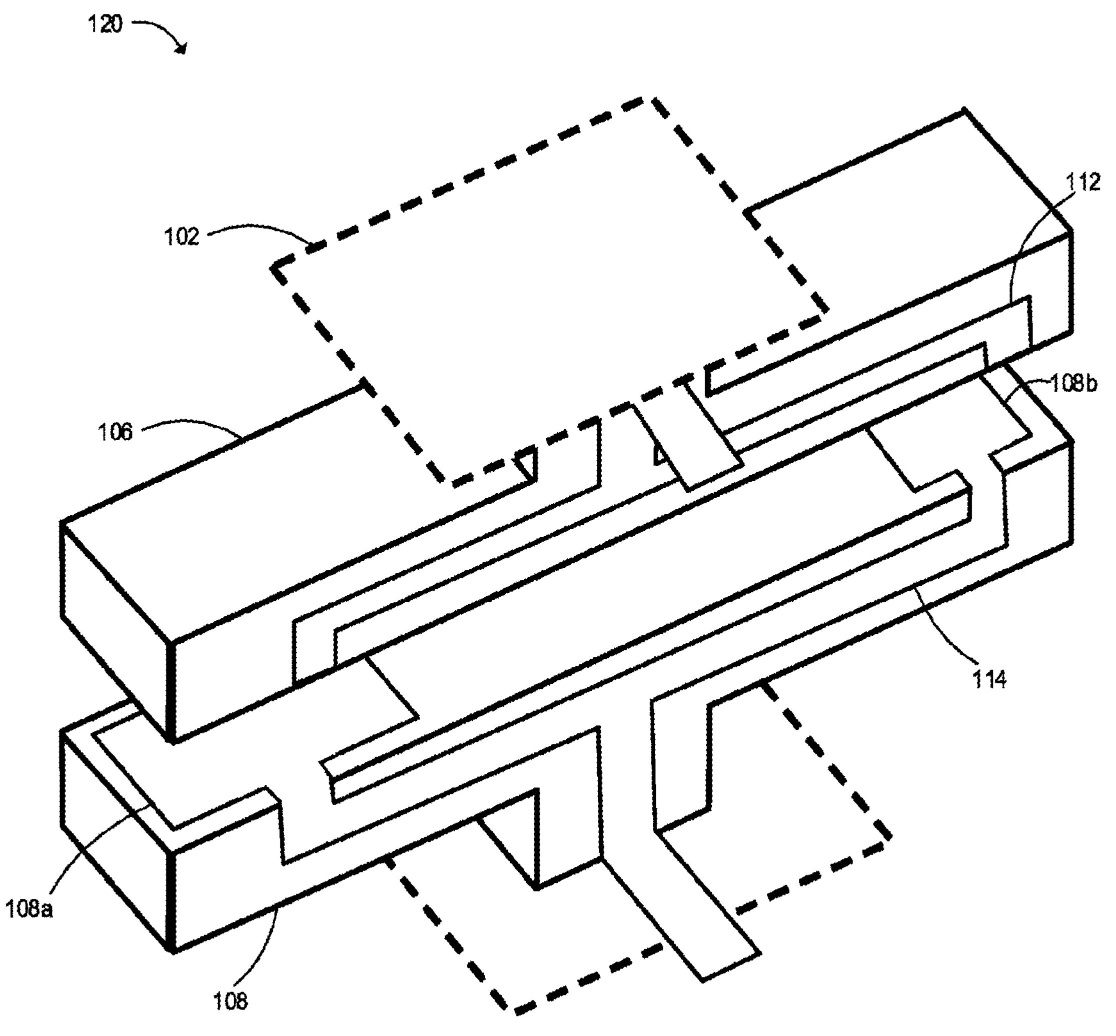
FIG. 2 is a perspective view of the article of FIG. 1.

The first electrically conductive portion 106*a* of the cathode 106 and the first electrically conductive portion 108*a* of the anode 108 are formed so as to face each other. Similarly, the second electrically conductive portion 106*b* of the cathode 106 and the second electrically conductive portion 108*b* of the anode 108 are formed so as to face each other. As shown more clearly in the perspective view of FIG. 2 (which only shows a portion of the substantive structure 102 such that the features positioned within the aperture are more visible), each of the cathode 106 and anode 108 are electrically connected to a conductive electrical connection 112, 114. The electrical connections 112, 114 are suitable for imparting an electrical potential difference between the first electrically conductive portion 106*a* of the cathode 106 and the first electrically conductive portion 108*a* of the anode 108 and between the second electrically conductive portion 106*b* of the cathode 106 and the second electrically conductive portion 108*b* of the anode 108. The cathode 106 electrical connection 112 is connected to a source of positive electrical potential such as a positive voltage, while the anode 108 electrical connection 114 is connected to a source of relatively less electrical potential such as ground. The electrical connections 112, 114 are formed as part of an additive manufacturing process such as the approach of Ladd et al described above, or any suitable approach to depositing conductive electrical connections by additive manufacturing while manufacturing the first article 100.

The first electrically conductive portions 106*a*, 108*a* of the cathode 106 and anode 108 therefore create a first capacitor having a first separation distance. This first separation distance, and therefore the capacitance of the first capacitor, is variable as a function of the pivoting angles of the cathode 106 and anode 108 on the cathode fulcrum 107 and anode fulcrum 109 respectively. Similarly, the second electrically conductive portions 106*b*, 108*b* of the cathode 106 and anode 108 create a second capacitor having a second separation distance. This second separation distance, and therefore the capacitance of the second capacitor, is variable as a function of the pivoting angles of the cathode 106 and anode 108 on the cathode fulcrum 107 and anode fulcrum 109 respectively.

As noted above, the cathode 106 and anode 108 can both be manufactured with predetermined at rest pivoting angles at the cathode fulcrum 107 and anode fulcrum 109 respectively. As the first and second separation distances are a function of the pivoting angles, the variable capacitor 120 may therefore be manufactured with a predetermined first separation distance and a predetermined second separation distance.

Pivoting of the cathode 106 and anode 108 may be caused by application of an electrical potential difference between the first electrically conductive portions 106*a*, 106*b* of the first capacitor and between the second electrically conductive portions 106*b*, 108*b* of the second capacitor, causing electrostatic attraction between the first electrically conductive portions 106*a*, 108*a* of the first capacitor and between the second electrically conductive portions 106*b*, 108*b* of the second capacitor. These electrostatic attractive forces are on opposing sides of the cathode fulcrum 107 and opposing sides of the anode fulcrum 109.

The cathode 106 will therefore experience a net torque if a magnitude of the torque experienced by the cathode 106 in an anti-clockwise direction caused by electrostatic attraction of the first electrically conductive portions 106*a*, 108*a* of the first capacitor is different to a magnitude of the torque experienced by the cathode 106 in a clockwise direction caused by electrostatic attraction of the second electrically conductive portions 106*b*, 108*b* of the second capacitor. Similarly, the anode 108 will experience a net torque if a magnitude of the torque experienced by the anode 108 in a clockwise direction caused by electrostatic attraction of the first electrically conductive portions 106*a*, 108*a* of the first capacitor is different to a magnitude of the torque experienced by the anode 108 in an anti-clockwise direction caused by electrostatic attraction of the second electrically conductive portions 106*b*, 108*b* of the second capacitor.

In the remainder of this description, the net torque experienced by the cathode 106 and anode 108 on application of the electrical potential difference is greater than the frictional torque of the cathode fulcrum 106 and anode fulcrum 108, resulting in pivoting of the cathode 106 and anode 108.

Application of the electrical potential difference therefore causes a change in the first and second separation distances of the first and second capacitors. Furthermore, as the first and second arms of the cathode 106 and anode 108 are of unequal length, then a magnitude of a change in separation distance of the capacitor that is further away from the fulcrums 107, 109 on application of the electrical potential difference will be greater than a magnitude of a change in separation distance of the capacitor that is closer to the fulcrums 107, 109. This in turn means that a magnitude of a change in capacitance of the capacitor that is further away from the fulcrums 107, 109 on application of the electrical potential difference will be greater than a magnitude of a change in capacitance of the capacitor that is closer to the fulcrums 107, 109. The overall capacitance of the variable capacitor 120 is a sum of the capacitance of the first capacitor and the capacitance of the second capacitor. As the magnitude of the change in capacitance for one capacitor is greater than the magnitude of the change in capacitance for the other capacitor, then there is a corresponding change in the overall capacitance of the variable capacitor 120 caused by application of the electrical potential difference. Furthermore, as the magnitude of change in separation distance, and therefore capacitance, is a function of the applied electrical potential difference, then the overall capacitance of the variable capacitor 120 is a function of the applied electrical potential difference.

The magnitude of change in separation distance, and therefore capacitance, are also a function of the length of the first arms, a length of the second arms, the frictional torque of the cathode fulcrum 107 and the frictional torque of the anode fulcrum 109. The magnitude of change in the overall capacitance of the variable capacitor 120 as a function of the applied electrical potential difference may therefore be configured by manufacturing the article 100 with particular values for one or more of these properties.

The variable capacitor 120 can also be manufactured such that the overall capacitance of the variable capacitor 120 is either proportional to or inversely proportional to the applied electrical potential difference. This property is determined based on whether the capacitor that is further away from the fulcrums increases its separation distance (resulting in an inversely proportional relationship) or decreases its separation distance (resulting in a proportional relationship) on application of the electrical potential difference. A first and second example will be described for illustrative purposes.

Figure 3A:
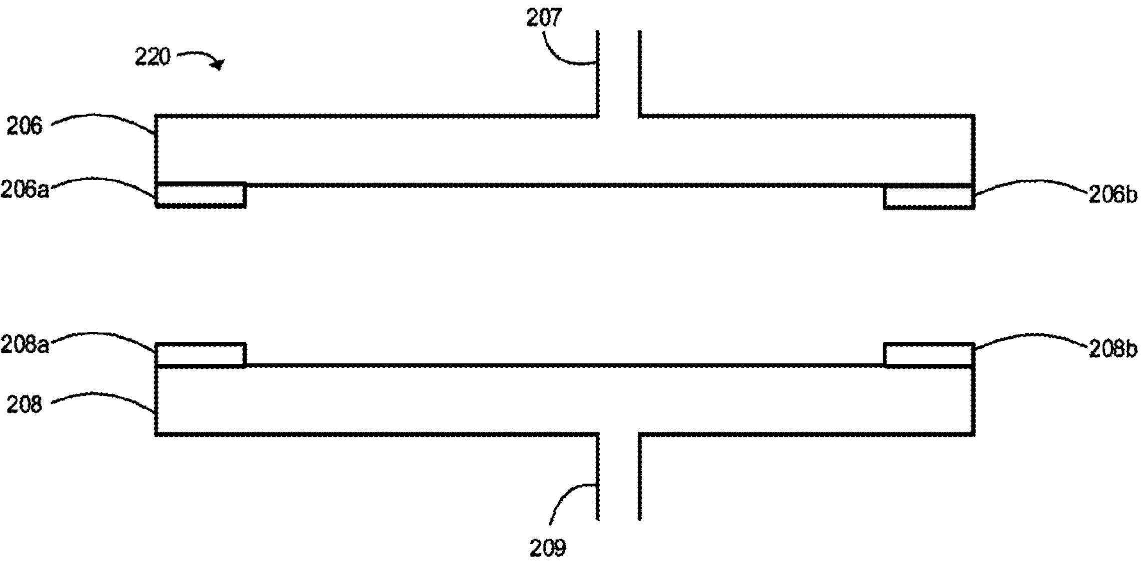
FIG. 3*a* is a cross-sectional view of a variable capacitor in a resting state.
Figure 3B:
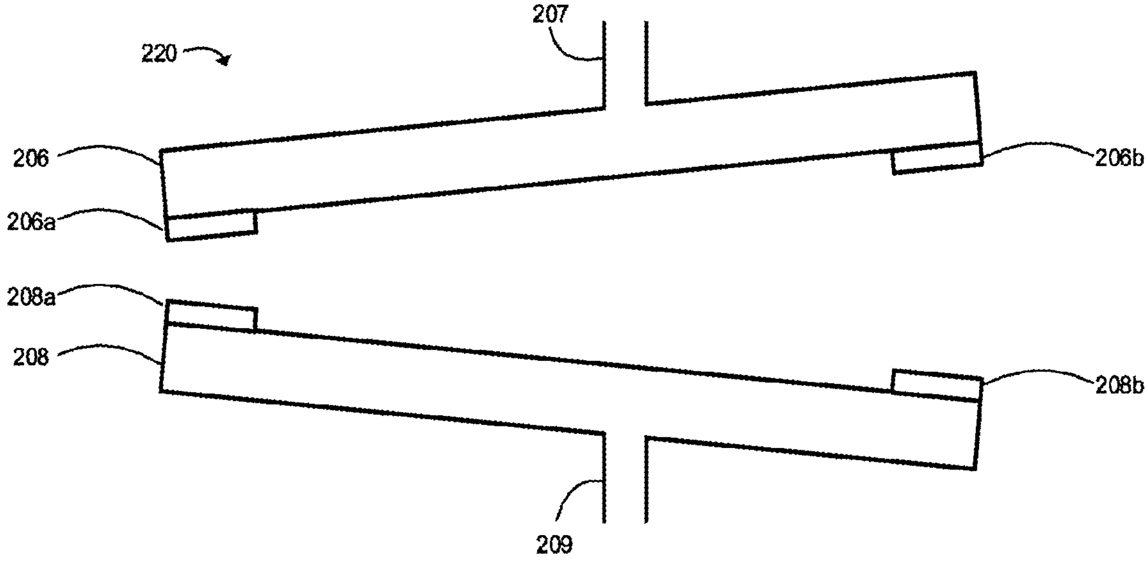
FIG. 3*b* is a cross-sectional view of the variable capacitor of FIG. 3*a* having an applied electrical potential difference.

A first example, as shown in a simplified diagram of FIG. 3*a*, is a variable capacitor 220 having a cathode 206, anode 208, cathode fulcrum 207 and anode fulcrum 209 manufactured such that: the first arms of the cathode 206 and anode 208 are longer than the second arms of the cathode 206 and anode 208 such that the first capacitor is further away from the fulcrums 207, 209 than the second capacitor, and, at rest, the cathode 206 and anode 208 are in parallel. When the electrical potential difference is applied, as shown in FIG. 3*b*, the torque experienced by the cathode 206 in an anti-clockwise direction due to the electrostatic force of attraction between the electrically conductive portions 206*a*, 208*a* of the first capacitor (that is further away from the fulcrums 207, 209) is greater than the torque experienced by the cathode 206 in a clockwise direction due to the electrostatic force of attraction between the electrically conductive portions 206*b*, 208*b* of the second capacitor (that is closer to the fulcrums 207, 209), resulting in rotation of the cathode 206 in the anti-clockwise direction. Furthermore, the torque experienced by the anode 208 in the clockwise direction due to the electrostatic force of attraction between the electrically conductive portions 206*a*, 208*a* of the first capacitor is greater than the torque experienced by the anode 208 in the anti-clockwise direction due to the electrostatic force of attraction between the electrically conductive portions 206*b*, 208*b* of the second capacitor, resulting in rotation of the anode 208 in the clockwise direction. This results in the first capacitor decreasing its separation distance (and therefore increasing its capacitance) and the second capacitor increasing its separation distance (and therefore decreasing its capacitance). As a magnitude of the increase in capacitance of the first capacitor is greater than a magnitude of the decrease in capacitance of the second capacitor, then there is a net increase in capacitance of the variable capacitor 220 as a function of the applied electrical potential difference. This first example therefore illustrates a variable capacitor 220 having an overall capacitance that is proportional to the applied electrical potential difference.

Figure 4A:
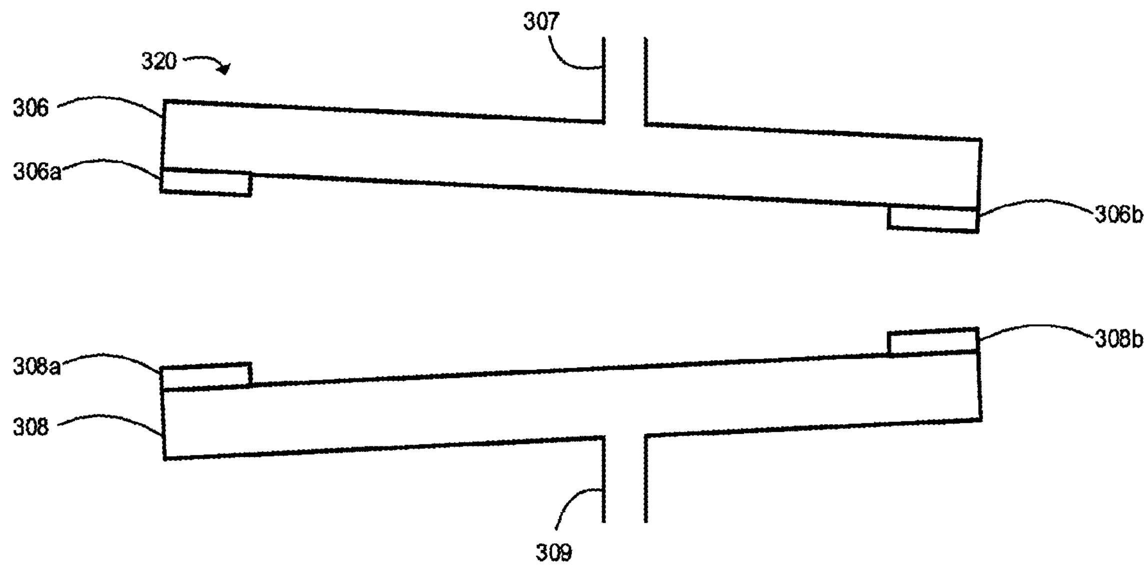
FIG. 4*a* is a cross-sectional view of a variable capacitor in a resting state.
Figure 4B:
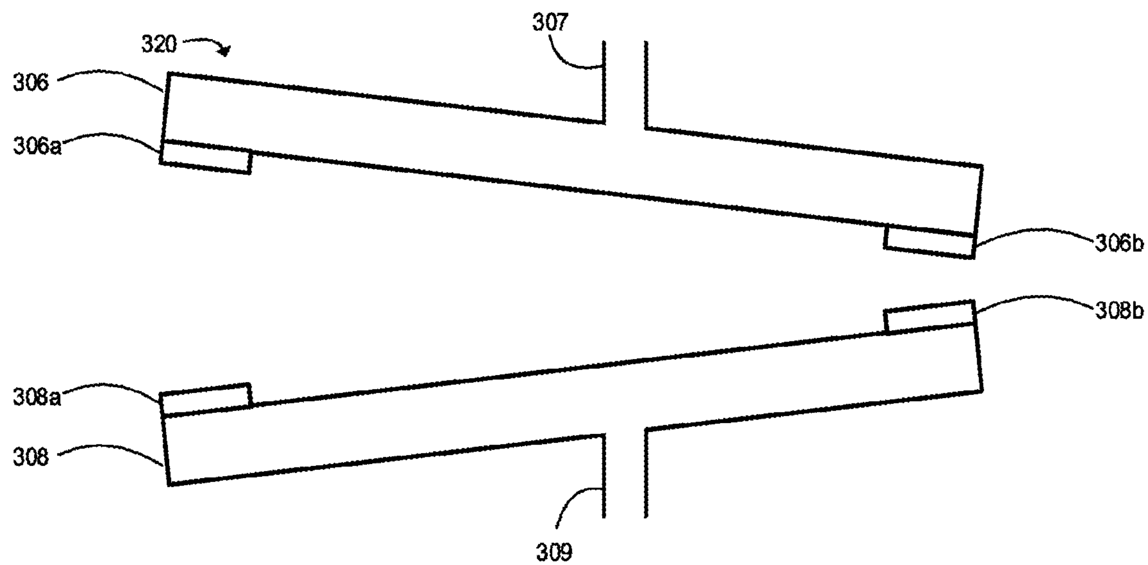
FIG. 4*b* is a cross-sectional view of the variable capacitor of FIG. 4*a* having an applied electrical potential difference.

A second example, as shown in FIG. 4*a*, is a variable capacitor 320 having a cathode 306, anode 308, cathode fulcrum 307 and anode fulcrum 309 manufactured such that: the first arms of the cathode 306 and anode 308 are longer than the second arms of the cathode 306 and anode 308 such that the first capacitor is further away from the fulcrums 307, 309 than the second capacitor, and, at rest, the cathode 306 and anode 308 are non-parallel such that the second separation distance of the second capacitor is less than the first separation distance of the first capacitor. On application of the electrical potential difference, as shown in FIG. 4*b:* the torque experienced by the cathode 306 in a clockwise direction due to the electrostatic force of attraction between the electrically conductive portions 306*b*, 308*b* of the second capacitor (being equal to this electrostatic force of attraction between the electrically conductive portions 306*b*, 308*b* of the second capacitor multiplied by the length of the second arm of the cathode 306) is greater than the torque experienced by the cathode 306 in an anti-clockwise direction due to the electrostatic force of attraction between the electrically conductive portions 306*a*, 308*a* of the first capacitor (being equal to this electrostatic force of attraction between the electrically conductive portions 306*a*, 308*a* of the first capacitor multiplied by the length of the first arm of the cathode 306), resulting in rotation of the cathode 306 in the clockwise direction; and the torque experienced by the anode 308 in the anti-clockwise direction due to the electrostatic force of attraction between the electrically conductive portions 306*b*, 308*b* of the second capacitor (being equal to this electrostatic force of attraction between the electrically conductive portions 306*b*, 308*b* of the second capacitor multiplied by the length of the second arm of the anode 306) is greater than the torque experienced by the anode 308 in the clockwise direction due to the electrostatic force of attraction between the electrically conductive portions 306*a*, 308*a* of the first capacitor (being equal to this electrostatic force of attraction between the electrically conductive portions 306*a*, 308*a* of the first capacitor multiplied by the length of the first arm of the anode 308), resulting in rotation of the anode 308 in the anti-clockwise direction.

This results in the second capacitor decreasing its separation distance (and therefore increasing its capacitance) and the first capacitor increasing its separation distance (and therefore decreasing its capacitance). As a magnitude of the decrease in capacitance of the first capacitor is greater than a magnitude of the increase in capacitance of the first capacitor, then there is a net decrease in capacitance of the variable capacitor 330 as a function of the applied electrical potential difference. This second example therefore illustrates a variable capacitor 320 having an overall capacitance that is inversely proportional to the applied electrical potential difference.

The relationship between the applied electrical potential difference and the overall capacitance of the variable capacitor is therefore determined by the length of the first arms, the length of the second arms, the first separation distance and the second separation distance, which are all set at manufacture. These properties may therefore be configured such that either:

a net torque experienced by the cathode and/or anode causes rotation of the cathode and/or anode so as to increase the separation distance of the capacitor that is closer to the fulcrum(s) and decrease the separation distance of the capacitor that is further away from the fulcrum(s), such that the overall capacitance is proportional to the applied electrical potential difference; or a net torque experienced by the cathode and/or anode causes rotation of the cathode and/or anode so as to decrease the separation distance of the capacitor that is closer to the fulcrum(s) and increase the separation distance of the capacitor that is further away from the fulcrum(s), such that the overall capacitance is inversely proportional to the applied electrical potential difference.

The electrical potential difference controlled variable capacitor may therefore be manufactured by 3D printing techniques (as described in more detail below) having a particular relationship between the applied electrical potential difference and its overall capacitance. Low-cost plastics and polymers may therefore be used (instead of ceramics) in the additive manufacturing process as there is no risk of thermal degradation. The variable capacitor may also be implemented in an electrical circuit by connection to two electrical connections, emulating existing reverse-biased semiconductor-based variable capacitors.

The benefits of 3D printing (discussed in the Background section above) may therefore be realised for an electrical potential difference controlled variable capacitor and any object that requires an electrical potential difference controlled variable capacitor. In a telecommunications example, a Reconfigurable Intelligent Surface (RIS) may be manufactured having a framework (constructed, for example, from a non-conductive material such as a plastic or polymer) and a plurality of unit cells positioned on the framework. The plurality of unit cells may be manufactured such that each unit cell contains a variable capacitor as described above and the electrical connections of each variable capacitor are connected to a central controller. The central controller may control the capacitance of each variable capacitor, by controlling the electrical potential difference applied to each variable capacitor, to change an incident electromagnetic field in a known way (e.g. change its phase).

The variable capacitor may be used in further applications, such as in a variable controlled oscillator, a parametric amplifier, a frequency multiplier, a phase locked loop and a tuning circuit.

Figure 5:
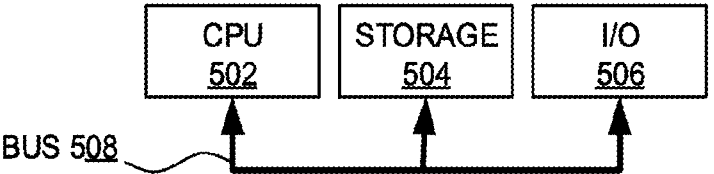
FIG. 5 is a block diagram of a computer system suitable for controlling the operation of an additive manufacturing machine.

FIG. 5 is a block diagram of a computer system suitable for controlling the operation of an additive manufacturing machine. A central processor unit (CPU) 502 is communicatively connected to a storage 504 and an input/output (I/O) interface 506 via a data bus 508. The storage 504 can be any read/write storage device such as a random access memory (RAM) or a non-volatile storage device. An example of a non-volatile storage device includes a disk or tape storage device. The I/O interface 506 is an interface to devices for the input or output of data, or for both input and output of data. Examples of I/O devices connectable to I/O interface 506 include a keyboard, a mouse, a display (such as a monitor) and a network connection.

Figure 6:
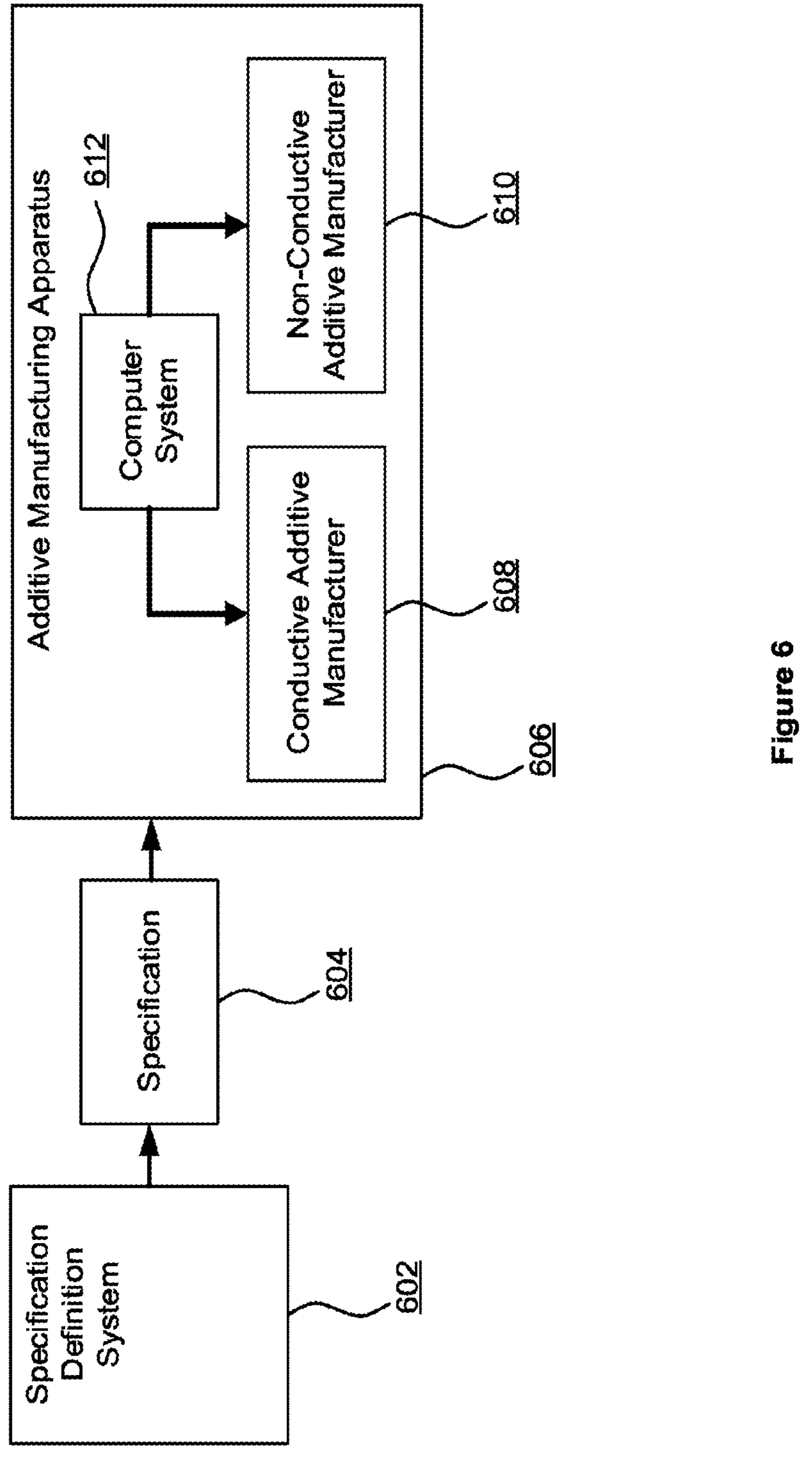
FIG. 6 is a component diagram of an additive manufacturing apparatus.

FIG. 6 is a component diagram of an additive manufacturing apparatus 606. The additive manufacturing apparatus 606 is a combination apparatus including a conductive additive manufacturer 608 for forming three dimensional structures from electrically conductive material, and a non-conductive additive manufacturer 610 for forming three dimensional structures from non-electrically conductive material. Manufacturers 608 and 610 are arranged so as to operate on the same subject article during manufacture such that the article can be subject to either or both the manufacture of conductive content or non-conductive content. It will be appreciated by those skilled in the art that the two manufacturers 608 and 610 can be combined or integrated into a single component capable of operating in multiple modes of capable of accommodating both conductive and non-conductive materials. The two manufacturers 608 and 610 operate in synchronisation and/or contemporaneously or a mixture of both synchronised and contemporaneous modes. For example, where a conductive additive manufacturing process occurs such that a non-conductive process could occur at the same time, then a contemporaneous mode of operation can be employed (though not necessarily). The operation of the manufacturers 608 and 610 is preferably computer controlled. In the embodiment of FIG. 6, a computer system 612 is communicatively connected to the conductive additive manufacturer 608 and the non-conductive additive manufacturer 610 for instructing each of the manufacturers 608 and 610 as to additive manufacturing operations that are to be undertaken. The computer system 612 is responsive to a specification 604 for an article for manufacture. In one embodiment the specification 604 is a digital representation of a three dimensional specification of an article for manufacture. For example, for an extrusion-based manufacturing process, the specification can include a definition of the materials for extrusion and the locations, positions, arrangements or configurations of one or more extruding heads, heads for a binder, setter, epoxy or the like and/or a table, workpiece or article holder. The manufacturing process can be defined using vector definitions specifying the discrete or relative movement or relocation etc. Alternatively, in a granular fusing based additive manufacturing approach, a location of fusing, binding, heating or the like can be specified by the specification 604, such as by way of control instructions for a laser or similar fusion mechanism. The specification 604 may be in the form of the Additive Manufacturing File format (AMF) or a Stereolithography file format (STL).

The specification 604 is provided by a specification definition system 602 such as a 3D modelling system, a computer aided design (CAD) or computer aided manufacturing (CAM) system as are known in the art. Such systems can be adapted to generate the specification 604 in an AMF or STL format. Such formats can be adapted to include additional information relating to electronic circuit elements such as active and passive components and electrical connections therebetween.

Although the variable capacitor has been described as being manufactured by an additive manufacturing process, the skilled person will understand that this is non-essential and the variable capacitor (or the object requiring the variable capacitor) may be manufactured by other methods, such as by machining, casting or moulding some or all of the parts.

The aperture of the variable capacitor may be a sealed vacuum. This may be achieved by manufacturing the article in a sealed atmosphere so that there is no fluid communication into or out of the aperture during manufacture, or by manufacturing a channel and evacuation port in the article and evacuating the aperture using a vacuum pump. This is beneficial when the variable capacitor is being used at high voltages or in high accuracy implementations. However, there is no requirement for a vacuum and this feature is therefore non-essential. The aperture may instead contain air.

The skilled person will understand that it is non-essential that both the cathode and anode pivot with respect to the substantive structure. That is, one of the cathode and anode may be fixed and may also be part of the substantive structure.

The skilled person will also understand that the technique for depositing electrically conductive material as described in Ladd et al. is non-essential and other techniques may be used. For example, commercially available additive manufacturing printers, such as the DragonFly IV, sold by Nano Dimension, could be used to manufacture the article with electrically conductive portions.

The skilled person will understand that any combination of features is possible within the scope of the invention, as claimed.

The invention claimed is:

1. A variable capacitor comprising:

a first elongate member comprising a first electrically conductive portion positioned towards a first distal end of the first elongate member and a second electrically conductive portion positioned towards a second distal end of the first elongate member, wherein the first elongate member is configured to pivot on a first fulcrum positioned between the first and second electrically conductive portions, wherein a first distance between the first fulcrum and the first electrically conductive portion of the first elongate member is different to a second distance between the first fulcrum and the second electrically conductive portion of the first elongate member;

a second elongate member comprising a first electrically conductive portion positioned towards a first distal end of the second elongate member and a second electrically conductive portion positioned towards a second distal end of the second elongate member, wherein:

one of the first and second elongate members is a cathode and the other of the first and second elongate members is an anode, a first capacitor is formed by the respective first electrically conductive portions of the cathode and anode, wherein a capacitance of the first capacitor is a function of a first pivoting angle of the first elongate member on the first fulcrum, and a second capacitor is formed by the respective second electrically conductive portions of the cathode and anode, wherein a capacitance of the second capacitor is a function of the first pivoting angle of the first elongate member on the first fulcrum, the first and second electrically conductive portions of the cathode are connected to a positive voltage of a first electric circuit, the first and second electrically conductive portions of the anode are connected to a negative voltage of the first electric circuit, such that the first and second capacitors are connected in parallel, and wherein:

application of an electrical potential difference by the first electric circuit causes pivoting of the first elongate member and a corresponding variation in the capacitance of the first capacitor that is proportional to the electrical potential difference and a corresponding variation in a capacitance of the second capacitor that is inversely proportional to the electrical potential difference, wherein the magnitude of the variations in capacitances of the first and second capacitors are different such that a sum of the capacitances of the first and second capacitor varies as a function of the electrical potential difference.

2. A variable capacitor as claimed in claim 1, wherein application of the electrical potential difference by the first electric circuit causes pivoting of the first elongate member due a torque experienced by the first elongate member in a first direction being a product of a force of electrostatic attraction between the first electrically conductive portions of the first capacitor and the first distance between the first fulcrum and the first electrically conductive portion of the first elongate member being greater than a torque experienced by the first elongate member in a second direction being a product of a force of electrostatic attraction between the second electrically conductive portions of the second capacitor and the second distance between the first fulcrum and the second electrically conductive portion of the first elongate member.

3. A variable capacitor as claimed in claim 2, wherein the first distance between the first fulcrum and the first electrically conductive portion of the first elongate member is greater than the second distance between the first fulcrum and the second electrically conductive portion of the first elongate member such that the sum of the capacitances of the first and second capacitor is proportional to the electrical potential difference.

4. A variable capacitor as claimed in claim 2, wherein the second distance between the first fulcrum and the second electrically conductive portion of the first elongate member is greater than the first distance between the first fulcrum and the first electrically conductive portion of the first elongate member and, prior to application of the electrical potential difference, the first pivoting angle of the first elongate member is such that a first separation distance between the first electrically conductive portions of the first capacitor is less than a second separation distance between the second electrically conductive portions of the second capacitor, such that the sum of the capacitances of the first and second capacitor is inversely proportional to the electrical potential difference.

5. A variable capacitor as claimed in claim 1, wherein the second elongate member is configured to pivot on a second fulcrum positioned between the first and second electrically conductive portions of the second elongate member, wherein a first distance between the second fulcrum and the first electrically conductive portion of the second elongate member is different to a second distance between the second fulcrum and the second electrically conductive portion of the second elongate member, wherein a capacitance of the first capacitor is a function of a second pivoting angle of the second elongate member on the second fulcrum and a capacitance of the second capacitor is a function of the second pivoting angle of the second elongate member on the second fulcrum.

6. A variable capacitor as claimed in claim 5, wherein application of the electrical potential difference by the first electric circuit causes pivoting of the second elongate member due a torque experienced by the second elongate member in the second direction being a product of a force of electrostatic attraction between the first electrically conductive portions of the first capacitor and the first distance between the second fulcrum and the first electrically conductive portion of the second elongate member being greater than a torque experienced by the second elongate member in the first direction being a product of a force of electrostatic attraction between the second electrically conductive portions of the second capacitor and the second distance between the second fulcrum and the second electrically conductive portion of the second elongate member.

7. A variable capacitor as claimed in claim 6, wherein the first distance between the second fulcrum and the first electrically conductive portion of the second elongate member is greater than the second distance between the second fulcrum and the second electrically conductive portion of the second elongate member.

8. A variable capacitor as claimed in claim 6, wherein the second distance between the second fulcrum and the second electrically conductive portion of the second elongate member is greater than the first distance between the second fulcrum and the first electrically conductive portion of the second elongate member and, prior to application of the electrical potential difference, a second pivoting angle of the second elongate member is such that the first separation distance between the first electrically conductive portions of the first capacitor is less than the second separation distance between the second electrically conductive portions of the second capacitor.

9. Apparatus comprising the variable capacitor as claimed in claim 1.

10. An additive manufacturing apparatus for manufacturing an article, the apparatus comprising:

a computer system;

a first additive manufacturing component adapted to form non-electrically conductive three dimensional structures;

a second additive manufacturing component adapted to form electrically conductive three dimensional structures;

wherein the first and second additive manufacturing components are operable under control of the computer system, the computer system being adapted to control the components to form a variable capacitor or apparatus as claimed in claim 1.

11. A computer system for controlling an additive manufacturing apparatus, the additive manufacturing apparatus being adapted to manufacture three dimensional structures from both non-electrically conductive and electrically conductive materials simultaneously, the computer system being operable to control the additive manufacturing apparatus to form a variable capacitor or apparatus as claimed in claim 1.

* * * * *